US010776852B2

(12) United States Patent
Farrell et al.

(10) Patent No.: US 10,776,852 B2
(45) Date of Patent: *Sep. 15, 2020

(54) CONTEXTUAL SOLICITATION IN A STARTER APPLICATION

(71) Applicant: Microsoft Technology Licensing, LLC, Redmond, WA (US)

(72) Inventors: Terry Farrell, Dublin (IE); Norbert van Woerkom, Dublin (IE); Robert McQuillan, Delgany (IE); David Mowatt, Dalkey (IE); Pieter Kasselman, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/989,751

(22) Filed: Jan. 6, 2016

(65) Prior Publication Data

US 2016/0196601 A1    Jul. 7, 2016

Related U.S. Application Data

(63) Continuation of application No. 14/557,207, filed on Dec. 1, 2014, now Pat. No. 9,324,063, which is a
(Continued)

(51) Int. Cl.
*G06Q 30/06* (2012.01)
*G06Q 30/02* (2012.01)
(Continued)

(52) U.S. Cl.
CPC ........... *G06Q 30/0631* (2013.01); *G06F 8/65* (2013.01); *G06Q 20/1235* (2013.01);
(Continued)

(58) Field of Classification Search
CPC ...... G06F 8/65; G06Q 30/0631; G06Q 30/02; G06Q 30/0269; G06Q 20/1235; G06Q 60/184
See application file for complete search history.

(56) References Cited

U.S. PATENT DOCUMENTS 5,903,896 A * 5/1999 Waldman .................. G06F 8/61
6,263,499 B1   7/2001 Nakamura et al.
(Continued)

FOREIGN PATENT DOCUMENTS

CN      101980232 A    2/2011
CN      102117388 A    7/2011
(Continued)

OTHER PUBLICATIONS

Wikipedia, "Office Assistant", http://en.wikipedia.org/wiki/Office assistant, Internet Archive 20 Feb 2010 (Year: 2010).*
(Continued)

*Primary Examiner* — Doon Y Chow
*Assistant Examiner* — Timothy P Duncan
(74) *Attorney, Agent, or Firm* — Newport IP, LLC; Jacob P. Rohwer

(57) ABSTRACT

A reduced capability subset of an application referred to as a "starter application" is provided on a computer device prior to purchase and intended for use by a user purchasing the computer device. The starter application may monitor input from the user when the starter application is executing to ascertain opportunities to inform the user of an upgrade and then solicit the user for purchasing the upgrade. The starter application may use a limited access browser to contact a server to assist in the solicitation and complete the transaction. Upon completing the transaction, the upgrade is provided to the computing device. The upgrade may comprise the full capability version of the application, templates,
(Continued)

clip art, or other software. The upgrade may entail transmitting the upgrade to the computer device or providing an authorization key to unlock the upgrade that is already stored on the computer device.

18 Claims, 6 Drawing Sheets

Related U.S. Application Data continuation of application No. 13/347,700, filed on Jan. 11, 2012, now Pat. No. 8,914,790.

(51) Int. Cl.
  *G06Q 20/12* (2012.01)
  *G06Q 50/18* (2012.01)
  *G06F 8/65* (2018.01)

(52) U.S. Cl.
  CPC ......... *G06Q 30/02* (2013.01); *G06Q 30/0269* (2013.01); *G06Q 50/184* (2013.01)

(56) References Cited

U.S. PATENT DOCUMENTS

| | | | |
|---|---|---|---|
| 6,460,141 B1 | 10/2002 | Olden | |
| 6,771,290 B1 | 8/2004 | Hoyle | |
| 7,016,944 B1 | 3/2006 | Meyer et al. | |
| 8,055,546 B1 | 11/2011 | Cassone et al. | |
| 8,113,951 B2 | 2/2012 | David et al. | |
| 8,126,071 B2 | 2/2012 | Choi et al. | |
| 8,216,071 B2 | 7/2012 | Lee et al. | |
| 8,452,797 B1 | 5/2013 | Paleja et al. | |
| 8,566,173 B2 | 10/2013 | Mahaniok et al. | |
| 8,578,275 B2 | 11/2013 | Brolley et al. | |
| 2001/0021914 A1 | 9/2001 | Jacobi et al. | |
| 2003/0004777 A1 | 1/2003 | Phillips | |
| 2003/0110094 A1 | 6/2003 | Gulliver et al. | |
| 2003/0140118 A1* | 7/2003 | Lloyd ................. | G06F 17/3089 709/218 |
| 2003/0181242 A1 | 9/2003 | Lee et al. | |
| 2004/0000338 A1 | 1/2004 | Heiderman | |
| 2004/0003389 A1* | 1/2004 | Reynar ...................... | G06F 8/65 717/178 |
| 2005/0026779 A1 | 2/2005 | Omata et al. | |
| 2005/0050315 A1 | 3/2005 | Burkhardt et al. | |
| 2005/0108707 A1 | 5/2005 | Taylor et al. | |
| 2005/0267799 A1* | 12/2005 | Chan ....................... | G06Q 30/02 705/14.49 |
| 2006/0265591 A1 | 11/2006 | Torrubia et al. | |
| 2007/0014322 A1 | 1/2007 | Rizoiu et al. | |
| 2007/0061198 A1* | 3/2007 | Ramer ................... | G06Q 20/12 705/14.53 |
| 2007/0143222 A1 | 6/2007 | Chicks et al. | |
| 2008/0113789 A1 | 5/2008 | Canessa et al. | |
| 2008/0113809 A1 | 5/2008 | David et al. | |
| 2008/0133211 A1 | 6/2008 | Dombrowski et al. | |
| 2008/0167970 A1 | 7/2008 | Nissim | |
| 2008/0250323 A1 | 10/2008 | Huff | |
| 2009/0006214 A1 | 1/2009 | Lerman et al. | |
| 2009/0100448 A1 | 4/2009 | Baker, III et al. | |
| 2010/0002787 A1 | 1/2010 | Choi et al. | |
| 2010/0011352 A1* | 1/2010 | Chu ..................... | G06F 9/44526 717/174 |
| 2010/0115401 A1 | 5/2010 | Nordine et al. | |
| 2010/0235254 A1 | 9/2010 | Mirrashidi et al. | |
| 2010/0262498 A1 | 10/2010 | Nolet et al. | |
| 2010/0262953 A1 | 10/2010 | Barboni et al. | |
| 2011/0010243 A1 | 1/2011 | Wilburn et al. | |
| 2011/0010244 A1 | 1/2011 | Hatridge et al. | |
| 2011/0055012 A1 | 3/2011 | Christianson et al. | |
| 2011/0153414 A1 | 6/2011 | Elvekrog et al. | |
| 2011/0246290 A1 | 10/2011 | Howard et al. | |
| 2011/0307354 A1 | 12/2011 | Erman et al. | |
| 2011/0320307 A1 | 12/2011 | Mehta et al. | |
| 2012/0072283 A1 | 3/2012 | DeVore et al. | |
| 2013/0019237 A1 | 1/2013 | Pardehpoosh et al. | |
| 2013/0179256 A1 | 7/2013 | Farrell et al. | |
| 2013/0179372 A1 | 7/2013 | Schentrup et al. | |
| 2013/0326499 A1 | 12/2013 | Mowatt et al. | |
| 2015/0186858 A1 | 7/2015 | Farrell et al. | |

FOREIGN PATENT DOCUMENTS

| | | |
|---|---|---|
| EP | 2059873 A2 | 5/2009 |
| JP | 11296437 A | 10/1999 |
| JP | 2002006974 A | 1/2002 |
| JP | 2004341618 A | 12/2004 |
| JP | 2005135367 A | 5/2005 |
| JP | 2007129340 A | 5/2007 |
| JP | 2008117078 A | 5/2008 |
| JP | 2008262580 A | 10/2008 |
| JP | 2009043062 A | 2/2009 |
| KR | 20080076337 A | 8/2008 |
| KR | 20110018304 A | 2/2011 |
| RU | 2008114331 A | 10/2009 |

OTHER PUBLICATIONS

Corby, Karen, "Windows Presentation Foundation on the Web: Web Browser Applications", Published on: Oct. 2005, Available at: <<http://msdn.microsoft.com/library/aa480223.aspx>>, pp. 11.

Davidsson et al., Utilizing Implicit Feedback and Contex to Recommend Mobile Applications from First Use, Feb. 13, 2011, ACM, In Proceedings of the 2011 Workshop on Context-awareness in Retrieval and Recommendation (CaRR 11 ), pp. 19-22.

Search Report Issued in European Patent Application No. 13735944. 4, ated Jul. 27, 2015, a counterpart foreign application of U.S. Pat. No. 8,914,790, 6 Pages.

"iAd Programming Guide", Jun. 6, 2011, Published on: Jun. 6, 2011, Available at: <<http://developer.apple.com/library/iOS/documentation/UserExperience/Conceptual/iAd_Guide/iAd Guide.pdf>, pp. 34.

International Search Report, dated Apr. 30, 2013, Application No. PCT/US2013/020713, Filed Date: Jan. 9, 2013, 9 pages.

"Mobile Social Networking and Gaming", Published on: Aug. 30, 2011, Available at: <<http://www.quirk.biz/cms/3244.guirk_emarketing_mobile_marketing101_ch8.pdf>>, Mobile Marketing 101: Chapter 8, pp. 8.

"MyMarket for Android", Jan. 2010 [retrieved on Feb. 3, 2012]. Retrieved at <<http://www.mymarket.cc>>, 5 pgs.

Office Action for U.S. Appl. No. 13/347,700 dated Mar. 13, 2014.

Office action for U.S. Appl. No. 13/485,847, dated Jan. 5, 2016, Mowatt et al., "Automatically Installing and Removing Recommended Applications", 44 pages.

Office Action for U.S. Appl. No. 13/485,847, dated Feb. 12, 2015, Mowatt et al., "Automatically Installing and Removing Recommended Applications", 39 pages.

Office action for U.S. Appl. No. 13/485,847, dated Jun. 4, 2015, Mowatt et al., "Automatically Installing and Removing Recommended Applications", 41 pages.

Office Action for U.S. Appl. No. 13/485,847, dated Jul. 18, 2014, David Mowatt, "Automatically Installing and Removing Recommended Applications", 35 pages.

Office Action for U.S. Appl. No. 13/347,700, dated Aug. 7, 2013.

Schafer, et al., "E-commerce Recommendation Applications", Retrieved at <<http://www.grouplens.org/papers/pdf/ECRA.pdf<<, Journal of Data Mining and Knowledge Discovery, vol. 5 Issue 1-2, 2001, pp. 115-153.

Wei et al., "A Market-Based Approach to Recommender Systems", Retrieved at <<http://sites.google.com/site/wyz666/AMarket-BasedApproachtoRecommenderSystems.pdf>, ACM Transactions on Information Systems, vol. 23, No. 3, Jul. 2005, pp. 227-266.

U.S. Appl. No. 13/485,847—Non Final Office Action dated Feb. 10, 2017.

"First Office Action and Search Report Issued in Chinese Patent Application No. 201380005354.9", dated Jun. 3, 2016, 21 Pages.

(56) References Cited

OTHER PUBLICATIONS

Office action for U.S. Appl. No. 13/485,847, dated Apr. 20, 2016, Mowatt et al., "Automatically Installing and Removing Recommended Applications", 43 pages.

Office action for U.S. Appl. No. 14/557,207, dated Jun. 4, 2015, Farrell et al., "Contextual Solicitation in a Starter Application", 29 pages.

"Office Action Issued in Mexican Patent Application No. MX/a/2014/008525", dated May 24, 2016, 3 Pages. (W/o English Translation).

U.S. Appl. No. 13/485,847—Final Office Action dated Aug. 25, 2017, 44 pages.

"Office Action Issued in Russian Patent Application No. 2014128339", dated Dec. 20, 2016, 8 Pages.

"Office Action Issued in European Patent Application No. 13735944.4", dated Feb. 14, 2018, 8 Pages.

"Office Action Issued in Australian Patent Application No. 2013208203", dated Oct. 6, 2017, 5 Pages.

"Office Action Issued in Mexican Patent Application No. MX/a/2014/008525", dated Aug. 31, 2017, 9 Pages.

"Office Action Issued in Australian Patent Application No. 2013208203", dated May 3, 2018, 5 Pages.

"Office Action Issued in Mexican Patent Application No. MX/a/2014/008525", dated Apr. 13, 2018, 4 Pages. (W/o English Translation).

"Office Action Issued in Korean Patent Application No. 10-2014-7019220", dated Dec. 31, 2018, 4 pages.

"Office Action Issued in Canadian Patent Application No. 2860632", dated Sep. 19, 2018, 8 Pages.

"Office Action Issued in Canadian Patent Application No. 2860632", dated Apr. 9, 2019, 8 Pages.

"Third Office Action Issued in Australian Patent Application No. 2018241159", dated Dec. 2, 2019, 3 Pages.

"Office Action Issued in Brazilian Patent Application No.BR112014016897-0", dated Dec. 24, 2019, 5 Pages.

"Office Action Issued in Australian Patent Application No. 2018241159", dated Aug. 23, 2019, 5 Pages.

"First Office Action Issued in Chinese Patent Application No. 201610868015.9", dated Mar. 16, 2020, 11 Pages.

"Office Action Issued in India Patent Application No. 4870/CHENP/2014", dated Feb. 6, 2020, 7 Pages.

"Notice of Allowance Issued in Korean Patent Application No. 10-2014-7019220", dated Jun. 29, 2019, 4 Pages.

"Office Action Issued in Australian Patent Application No. 2018241159", dated Jul. 2, 2019, 8 Pages.

* cited by examiner

CONTEXTUAL SOLICITATION IN A STARTER APPLICATION

CROSS-REFERENCE TO RELATED APPLICATION

This application is a continuation of, and claims priority to, commonly owned, U.S. patent application Ser. No. 14/557,207 filed Dec. 1, 2014, and entitled "Contextual Solicitation In A Starter Application," which is a continuation of, and claims, priority to, commonly owned, U.S. patent application Ser. No. 13/347,700 filed Jan. 11, 2012, and entitled "Contextual Solicitation in a Starter Application," now U.S. Pat. No. 8,914,790, issued on Dec. 16, 2014, both of which are herein incorporated by reference in their entirety.

BACKGROUND

Manufacturers of consumer-oriented computing devices, such as laptops or desktop computers, may pre-load software on the computing device at the time of manufacture so that the user can immediately use the computing device for various applications after purchasing the computing device. For example, many computers are pre-loaded with some version of word processing software so that a user can immediately use the computer to create letters or other such documents. Other applications, such as spreadsheet processing applications may be included as well. Purchasers of computers that can immediately use the computer may perceive immediate value in the computer.

The pre-loaded software application may be based on a reduced capability set of an existing software application. Such pre-loaded software is commonly referred to as a "starter" application version of the "full" version of the software application. Thus, the word processing starter application pre-loaded on a computer may have a subset of the features and capabilities available in the full version of the application. Software manufacturers find that providing a starter application of a software application allows users to gain familiarity with the software application and increases the likelihood that the user will later purchase the full version of the software application.

A user of the starter application may believe that the starter application is sufficient to meet their initial needs. However, as the user becomes more proficient with using the starter application, the user may encounter deficiencies in trying to perform certain functions and may not always know when the additional capabilities in the full version may be useful. Thus, if the user is not made aware in a timely manner of the additional functionality in the full version that is available, then the user may not appreciate that the full version would provide additional benefits to the user. In turn, the user may be less likely to purchase the full version of the application.

It is with respect to these and other considerations that the disclosure made herein is presented.

SUMMARY

Concepts and technologies are described herein for providing contextual solicitations for purchasing a software upgrade. The contextual solicitations may be initiated by a starter version of an application program and the software upgrade may be the full version of the application program. Alternatively, the software upgrade may comprise other related software that operates with the application, such as templates, clip art, or tutorials designed to interact with the starter application or the full application.

In one embodiment, a method of providing an upgrade includes the operations of monitoring input by the starter application executing on a processor in the computing device, where the input is provided by a user of the starter application. The method further includes ascertaining by the starter application based on the input from the user an opportunity to provide an upgrade to the starter application to the user and soliciting the user to purchase the upgrade to the starter application. The method further includes completing a transaction by the starter application to purchase the upgrade, and enabling access to the upgrade at the computing device.

In another embodiment, a computer readable storage medium storing instructions that when executed by a processor of a computing device cause the processor to monitor input by a starter application executing on the processor, where the input is provided by a user of the starter application and the starter application includes a subset of functions of a full application. The instructions further cause the processor to ascertain based on the input from the user an opportunity to solicit the user to receive an upgrade, solicit the user by the starter application to purchase the upgrade by prompting the user to purchase the upgrade, complete a transaction to purchase the upgrade and provide the upgrade to the computing device.

In another embodiment a system for providing updates to a user includes a memory storing a starter application that includes a reduced capability set of a full version of a word processing application and a processor, where the processor is configured to receive input from the user editing a word processing document, and inform the user that a requested function is not available in the starter application. The processor is further configured to inform the user that the requested function is available in the full version, solicit the user to purchase the full version, and provide the full version of the word processing application to the user.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
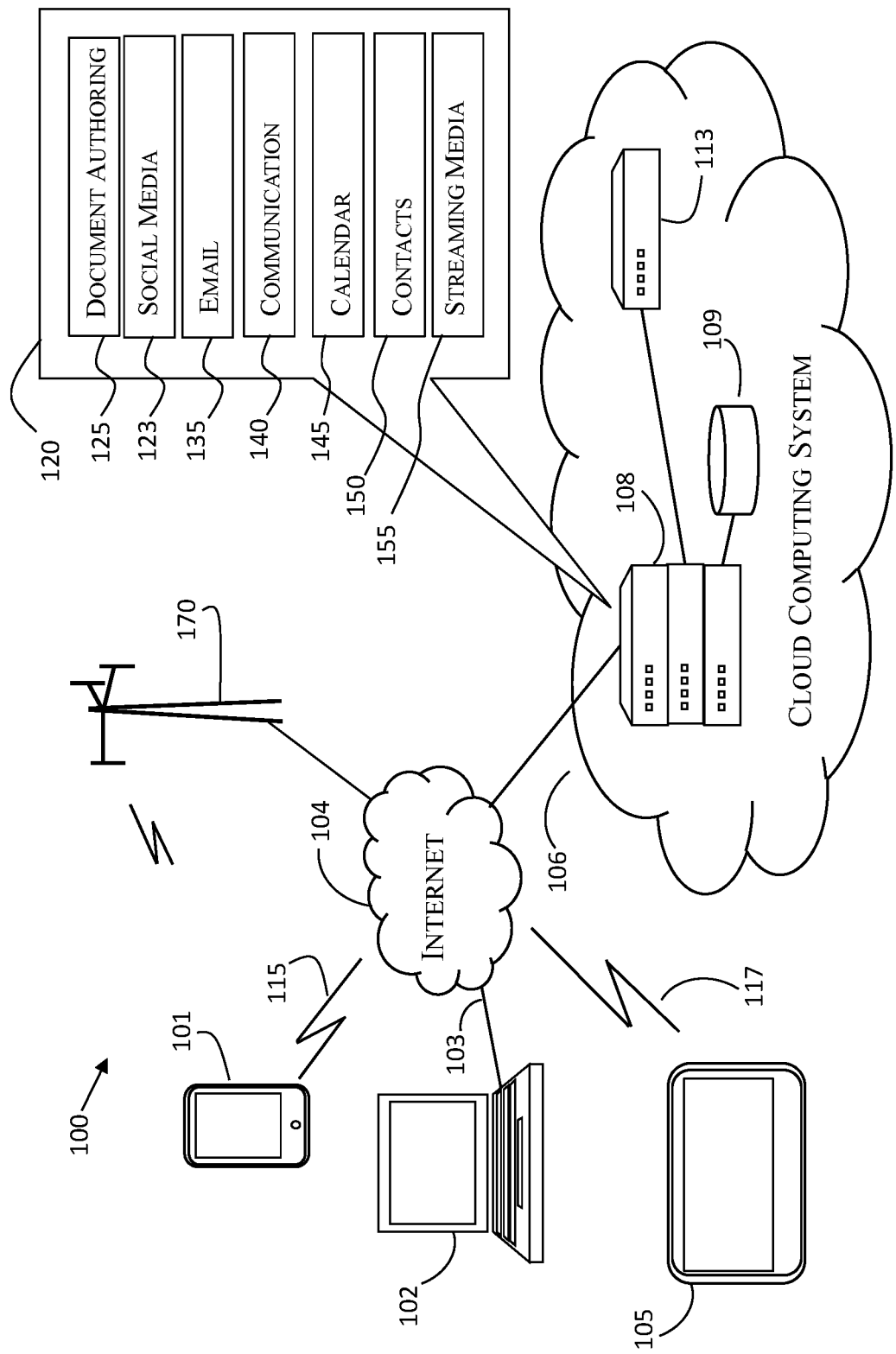
FIG. 1 is an illustration of one context of various computing devices using the capabilities described herein.

In the following detailed description, references are made to the accompanying drawings that form a part hereof, and which are shown by way of illustration specific embodiments or examples. Referring now to the drawings, in which like numerals represent like elements throughout the several figures, aspects of configuring a drawing guide will be presented.

As described above, many computer manufacturers have found it beneficial to form agreements with software manufacturers to include pre-loaded software on a computing device at the time of sale. Thus, the software manufacturer provides software to the computer manufacturer to pre-load onto the computer. Pre-loading software can facilitate the purchaser's productivity after purchasing the computing device. This allows users to immediately use the computing device to perform various functions after purchasing the device. Software manufacturers frequently provide reduced functionality applications. Such applications are sometimes referred to as a "starter" version of the software application for this purpose (henceforth referred to herein as a "starter application" or "starter version"). The version of the software application with the full set of capabilities may be referred to as the "full application" or the "full version."

Pre-loading the starter application allows purchasers to immediately begin using and gain familiarity with the software. The starter application can be a word-processing program, a game, spreadsheet program, tutorial program, etc. Typically, the starter application includes a core set of functions that allows the starter application to be useful in its own right, but the more advanced functions or capabilities are removed or disabled.

The relationship of the starter application and the full application can be viewed as an application with two versions having two levels of functionality—a reduced feature set and a full feature set. Other embodiments of the concepts described herein can apply to a software application having more than two levels of functionality. For example, a software application may be packaged with three functionality levels—a starter level, an advanced level, and a professional level. Other embodiments may have more levels. Further, it is not required that the concepts disclosed herein apply only to upgrading from the current level version of the application, or apply to only when upgrading from a pre-loaded version on the computer device. The concepts herein may apply to upgrading to an enhanced version regardless of how the user obtained the lowest level of the software application. Further, the user may upgrade by "skipping" intermediate versions of the application and upgrading to the most current or advance version. Further, other types of applications may be associated with the upgrade. However, for purposes of illustration, the concepts and technologies herein are mainly described in terms of a starter application pre-loaded on a computing device and wherein the user is upgrading to a full application.

At any time after using the starter application, the user may subsequently purchase the next higher level, or the full application in order to achieve the maximum productivity and usefulness of the software application. However, the user may not appreciate when the additional capabilities may be useful. In other words, if the user is unable to use certain features in a starter application, the user may be unaware that these features even exist and are available in the full application. Thus, informing the user at an opportune time allows the user to be cognizant when the additional features would be useful. Soliciting the user at the proper time to obtain the full application can significantly increase the likelihood of the user purchasing the upgrade.

Further, the user can be solicited to obtain not only the full application, but other add-ons that provide value added capabilities to the current version of the application. The add-on can take the form of a template, tutorial, clip art, etc. The term "upgrade" as used herein refers to any productivity enhancement module that can be provided to the user, which includes an upgraded functional level of the application (full application) and/or any add-on, such as a template library that works with the starter application or full application. In some embodiments, the upgrade may be for another type of application, but which integrates with the starter application. For example, the starter application may be a word processing application that allows drawing objects to be edited and inserted into a word processing document. After observing the user editing and inserting a drawing object (or repeatedly doing so), the user may be then prompted to upgrade. In this example, the word processing application could solicit the user to purchase an upgrade that is a drawing application.

An upgrade can encompass productivity enhancement modules which provide further information to the user, such as how to use an existing feature. Thus, tutorials in the form of texts, graphical presentations, videos, or other forms describing how to use an existing feature, along with an enhanced feature, may be provided to a user at an opportune time. Upgrades may comprise special offers offering discounts. Upgrades may comprise free or discounted trials where additional capabilities can be tested and used, without a commitment to complete a purchase transaction. In other embodiments, users may be offered to try certain features or identified capabilities for a limited number of times or for a limited duration. After this time, the user may be solicited again to obtain the upgrade.

As noted, users may not be aware of the existence of the upgrade. Even if they are aware, users may not even be aware that the upgrade is relevant to a particular function or task currently performed by the user. Soliciting the user at the proper time involves achieving a contextual understanding by the starter application of how the user is presently interacting with the application, and what the user is using the application for. This involves identifying when the upgrade would be relevant to the user's current usage of the application and soliciting the user at that moment for the appropriate upgrade.

One context of how the capabilities disclosed herein can be used is shown in FIG. 1. FIG. 1 illustrates a system 100 comprising various computing devices, such as a smart phone 101, laptop computer 102, or a tablet computer 105. These computing devices may execute various applications stored in the computing device, which may have been loaded onto the computing device by the computing device manufacturer. These computing types are illustrative, and are not intended to limit the application of the concepts disclosed herein.

These computing devices may access, via the Internet 104, various services provided by a cloud computing system 106. The computing devices can include desk-top computers, personal digital assistants, e-book readers, etc. The computing devices can utilize wireless connections 115, 117 to interact with a cloud computing system 106. The wireless connections for the devices are conveyed in one embodiment by the Internet 104 to the cloud computing system 106. The wireless connections can be based on various readily available technologies, including the various cellular based technologies (CDMA, GSM, 4G, EDGE, etc.) originating from cellular infrastructure 170 provided by a cellular service provider or involving other wireless technologies (e.g., WiMax, WiFi, etc.). The wired technologies can be based on ISDN, cable modems, DSL, and other well-known forms.

The connectivity afforded by the wired 103 and wireless 115, 117 communications through the Internet 104 provides the computing devices with access to a server 108 in the cloud computing system 106. The various applications executing on the computing device may also interact with the server 108. Although the concepts illustrated herein may refer to a single server 108, various servers in the cloud computing system 106 may be involved. For example, one server 108 accessed by a device may in turn access another server 113 or a data store 109 to provide service to a user. Thus, a plurality of download servers may be used in certain embodiments.

The server 108 may store and/or execute various application programs 120 on behalf of a user. These may be executed in a shared or distributed manner across one or more servers and interact with the computing device 101, 102, or 105. The application programs 120 may include a drawing application 121 for creating and editing graphical oriented programs. Applications for editing images, video, etc. may also be considered with the scope of a drawing application. Other forms of authoring applications 125 may also create and edit documents, such as text documents and spread sheet documents.

Other applications executing on the server 108 may include social media applications 120 for group related messaging and communications. Another application program present may be an email/messaging application 135 and may allow for various messaging capabilities, including instant messaging. A communications application 140 may allow for video chat or voice communication. A calendar application 145 may allow for organizing meetings and events. A contact application 150 may allow for organizing contact information for a user. A streaming media application 155 may provide for streaming digital data, such as audio or video files. Each of these applications may store data, which the server 108 may maintain in a data store 109, which in turn may comprise various storage systems.

In one embodiment, the user may be executing an application program in the computing device, such as the laptop 102, which is the starter application. In some embodiments, the starter application may communicate with one of the server computers 108 by initiating and receiving messages sent via the Internet 104.

Figure 2:
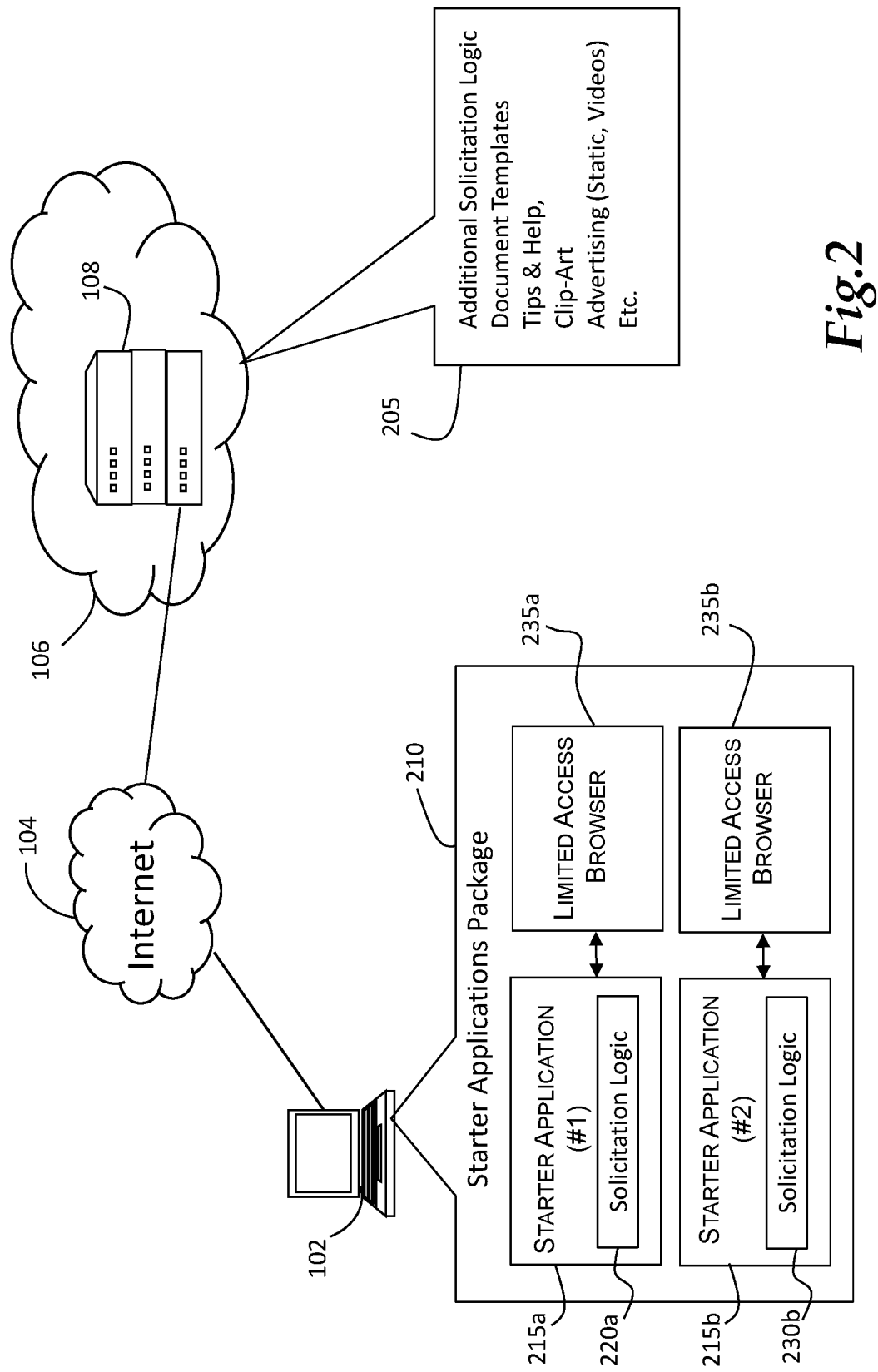
FIG. 2 is an illustration of an architecture of a starter application providing contextual solicitations and accessing a server for upgrades.

A more focused context is shown in FIG. 2. FIG. 2 shows a system 200 comprised of the computing device 102 that is able to access the server 108 in the cloud computing system 106. The laptop 102 is loaded with a starter applications package 210, which in this embodiment is a suite of starter application programs. Specifically, the starter applications package 210 suite comprises starter application s 215*a* and 215*b*. These starter applications 215*a*, 215*b* could be any type of reduced functionality application program, such as a program for word processing, spreadsheets, slide presentation programs, games, tutorials, etc. In the embodiment shown in FIG. 2, starter application 215*a* is assumed to be a word processing application and starter application 215*b* is assumed to be a spreadsheet program.

Each starter application 215*a* and 215*b* may respectively incorporate solicitation logic 220*a*, 220*b*. This may be accomplished in one embodiment by integrating the solicitation logic into the starter application, or in another embodiment, tightly coupling the solicitation logic with the starter application. The solicitation logic 220*a*, 220*b* may be designed for a particular starter application. Thus, the solicitation logic 220*a* for starter application 215*a* may be different from the solicitation logic 220*b* for starter application 215*b* since the solicitation logic 220*a* is centered on a word processing context. However, the solicitation logic 220*a* itself can be upgraded, as will be discussed later. The solicitation logic modules 220*a*, 220*b* typically perform similar functions, which is to ascertain an opportune time for soliciting the user for an upgrade. Thus, the solicitation logic may share common logic in some embodiments, such as the ability to identify certain words or identify certain functions that are not available in the starter application 215*a*, but that are available in the full version of the application. The solicitation logic 220*a* may interact with the starter application 215*a* to determine the context at runtime. For example, the solicitation logic 220*a* may ascertain what type of document is being opened, how frequently the user has interacted with this type of document using the starter application, etc.

Each starter application 215*a*, 215*b* typically accesses a limited access browser 235*a*, 235*b*. The limited access browser incorporates a subset of the functionality that may be incorporated in a web browser, but its access is controlled and limited to the starter application. Other applications in the computer 102 may not be able to access this functionality and certain limitations in the functionality of the browser may be defined. For example, the resources in the computer 102 that the server 108 can access may be limited via the browser. Hence, it if referred to herein as a "limited access" browser. Nothing precludes other applications from incorporating a limited access browser for other purposes, however. In one embodiment, each limited access browser 235*a* and 235*b* may be identical in functionality. In other embodiments, a single limited access browser 235*a* may be shared by all the starter applications 215*a*, 215*b* in the starter application package 210. For sake of illustration, the concepts are explained henceforth in terms of a single starter application, namely starter application 215*a* directed to word processing.

The starter application 215*a* may access the limited access browser 235*a* for interacting with a service identified by a URL or other address identifier in the server 108. The server 108 may also execute applications 120 that may also provide document templates, tips and help, clip art, advertising graphics (static and video), and other upgrades known to those skilled in the art. In another embodiment, the solicitation logic is not integrated with the starter application 215*a*, but it is executed in server 108. In this embodiment, the starter application 215*a* is able to trigger to an externally executed solicitation logic and pass context information to the solicitation logic when triggered. Further, the solicitation logic can be upgraded over time by downloading new solicitation logic to the starter application or updating the solicitation logic in the server.

In one embodiment, the starter application 215*a* is a word processing program that when executed, provides a reduced capability set of word processing capabilities. The solicitation logic 220*a* may monitor the activities of the user to ascertain when an opportunity arises for soliciting the user. This may involve communication between the starter application 215*a* and the solicitation logic 220*a* as to what actions the user is currently performing on a document. The communication may include reporting each function, keystroke, or history of the last few functions or keystrokes. The communication can also provide contextual information, such as what types of objects are being processed, how long the starter application has been used, what help functions have been invoked, etc.

Figure 3:
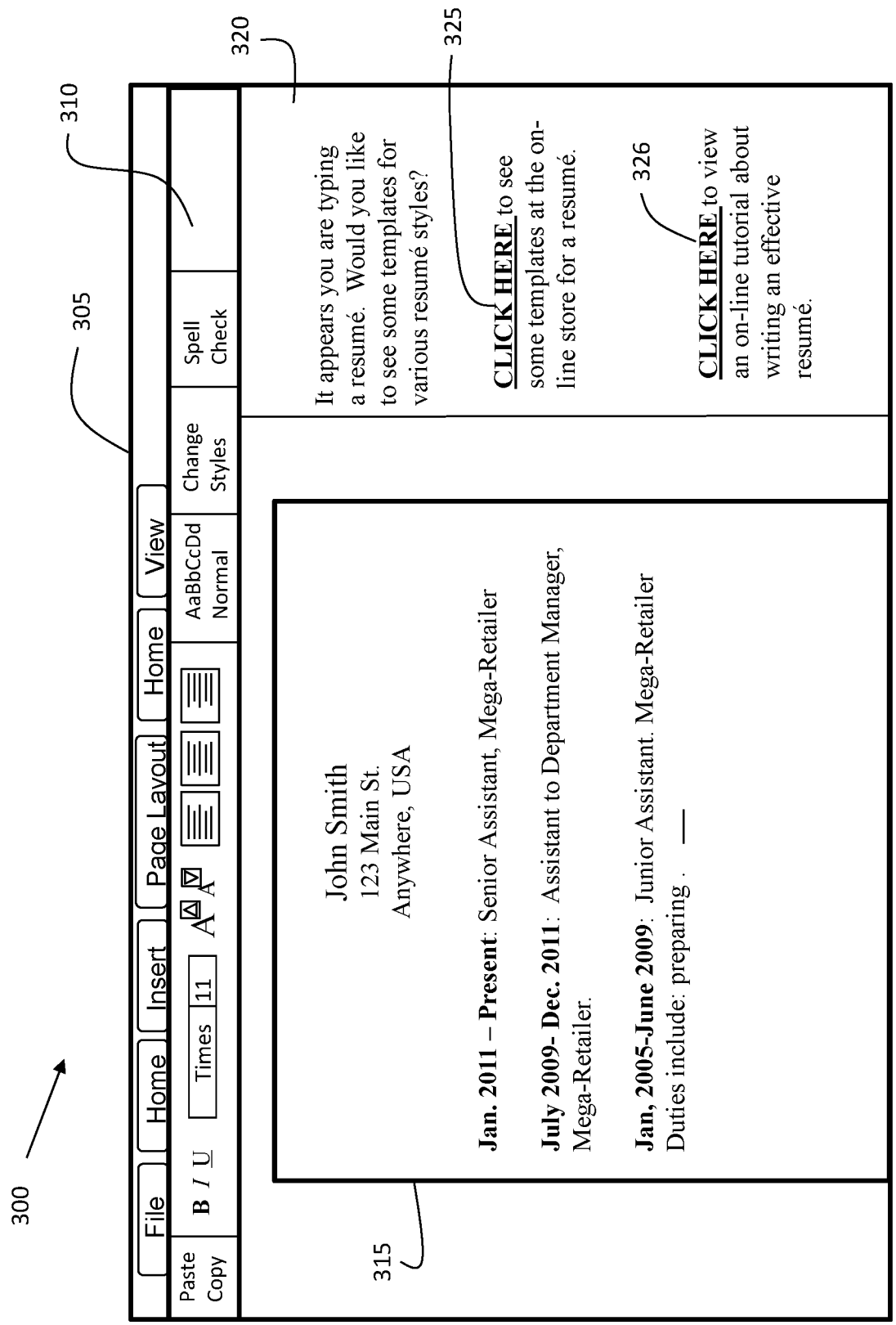
FIG. 3 is a user interface of one embodiment of the starter application soliciting a user for an upgrade.

For example, turning to FIG. 3, a display 300 shows a document 315 being edited using the starter application 215*a*. In FIG. 3, the user is provided with a user interface 300 in the display 305. The display 305 includes the starter application menu bar 310 displaying various word processing functions, a view of the document 315 in an editing pane, and a solicitation pane 320. In this embodiment, the solicitation pane 320 is an area located to the right of the document 315 that may provide text messages, images and/or video to the user based on the context of what the user is doing.

The depiction of the user interface 300 in FIG. 3 does not depict all the possible functions and associated icons that may be provided. The exact text in the document 315 of the document may vary and for illustration purposes represents the beginning of a resume.

The solicitation logic 220a can parse the structure of document 315 and can ascertain that the document 315 is a resume of some sort. The solicitation logic 220a in the starter application may derive this from the format and structure of the document, based on for example, the positioning of dates, that a name that is centered on the first page, and/or the file name (e.g., the file may be called "John Smith Resume"). Any number of rules can be used to determine that the document is a resume.

These rules can be deterministic or probabilistic. For example, a model can be used to ascertain when a user may be likely to request an upgrade. Collective information on upgrades from various users can be maintained and analyzed to identify patterns that the present user is following to predict the likelihood the user will upgrade in context of the current circumstances. This model can be based in the solicitation logic executing in the user's computer or executing in a server 108. The model may identify several opportunities and associated probabilities for an upgrade, and select the opportunity with the greatest likelihood of success. For example, the model may predict that after a user has invoked a function in the starter application over a dozen times, then it is appropriate to then solicit the user for a certain type of upgrade related to that function.

Once the solicitation logic determines that the user is working on a resume, the solicitation logic can then prompt the user in the solicitation pane 320 for various types of upgrades. For example, if the document is a resume, the user could be prompted in the solicitation pane 320 to view exemplary resume templates or receive resume drafting guidelines. The user may be presented with and select a link 325 to connect to the server 108 for the purpose of viewing templates and/or the guidelines. The user may also be presented with a link to view an on-line tutorial about writing effective resumes. The user's response to these solicitations may also be analyzed to provide feedback as to when and how to solicit the user for other types of requests. Further, the user's response may be used to update a solicitation model, which can be the basis for triggering other solicitations to the user, or to other users. The solicitation model can be executed in the solicitation logic in the user's computer or in a network based server.

Returning to FIG. 2, the starter application 215a is able to interact with the limited access browser 235a. In some embodiments, the solicitation logic 220a can interact with corresponding solicitation logic in the server 108 to ascertain the type of document being edited (e.g. resume, letter, memo, etc.). In various embodiments, the solicitation logic 220a may also provide a keystroke history associated with this document, portions of the document, file name, or other information to the server 108. In other embodiments the solicitation logic 220a can provide the type of application, installation date, frequency of use, Internet related cookies, and other usage aspects. The server 108 can respond by providing information as to the type of upgrades that would be applicable for the present document.

For example, the solicitation logic 220a may note the frequency of use of certain combined functions for certain documents. Specifically, if the user frequently invokes a "help" function prior to invoking that function for a certain type of document object, coupled with long time periods of inactivity, this condition may suggest difficulties the user is encountering in using that particular function for that type of document. This set of conditions may trigger solicitation of a particular upgrade in the form of a tutorial program that focuses on the particular function. However, if the user does not frequently invoke the help function, which suggests the user knows how to use the function, then solicitation of the tutorial function may not be productive.

In other embodiments, the solicitation logic 220a can determine the type of document without accessing the server 108. The solicitation logic 220a can then inform the user of the type of upgrade that may be applicable and useful to the user, and solicit the user for obtaining the upgrade. The solicitation logic 220a may then use the limited access browser 235a to access the upgrade from the server 108. The server 108 then provides the requested upgrade to the user, which may be a template, guideline, or other form of upgrade.

The limited access browser 235a is limited in that its access is controlled by the starter application 215a. In some embodiments, the user or other applications cannot directly access the limited access browser 235a. The starter application 215a carefully controls the access to other resources on the computing device by the limited access browser 235a. Further, the capabilities of the limited access browser 235a are limited as well. For example, the limited access browser 235a may be limited from accessing the disk drive of the computer device or executing any files stored thereon.

As noted before, the server 108 may also execute a form of solicitation logic processing, and interact with the starter application 215a executing in the computing device. The starter application 215a may inform the server 108 as to the contents of the document, and the solicitation logic in the server 108 may analyze the contents, and in response, provide the appropriate text response in the solicitation pane 320. In either approach, if the user accepts the solicitation offer, a query is launched to the server to obtain the upgrade, where further information is provided on the solicitation pane. The further information may include a sample template, price information, number of templates in the upgrade, etc.

The starter application may have various serial numbers or authorization information encoded within it that may be reported to the server 108 in conjunction with obtaining the upgrade. If incorrect authorization information is provided by the starter application to the server, the server may deny the upgrade request. In other embodiments, if the authorization information is valid, this may entitle the user to receive a discount or other benefits from the server in conjunction with the upgrade.

Figure 4A:
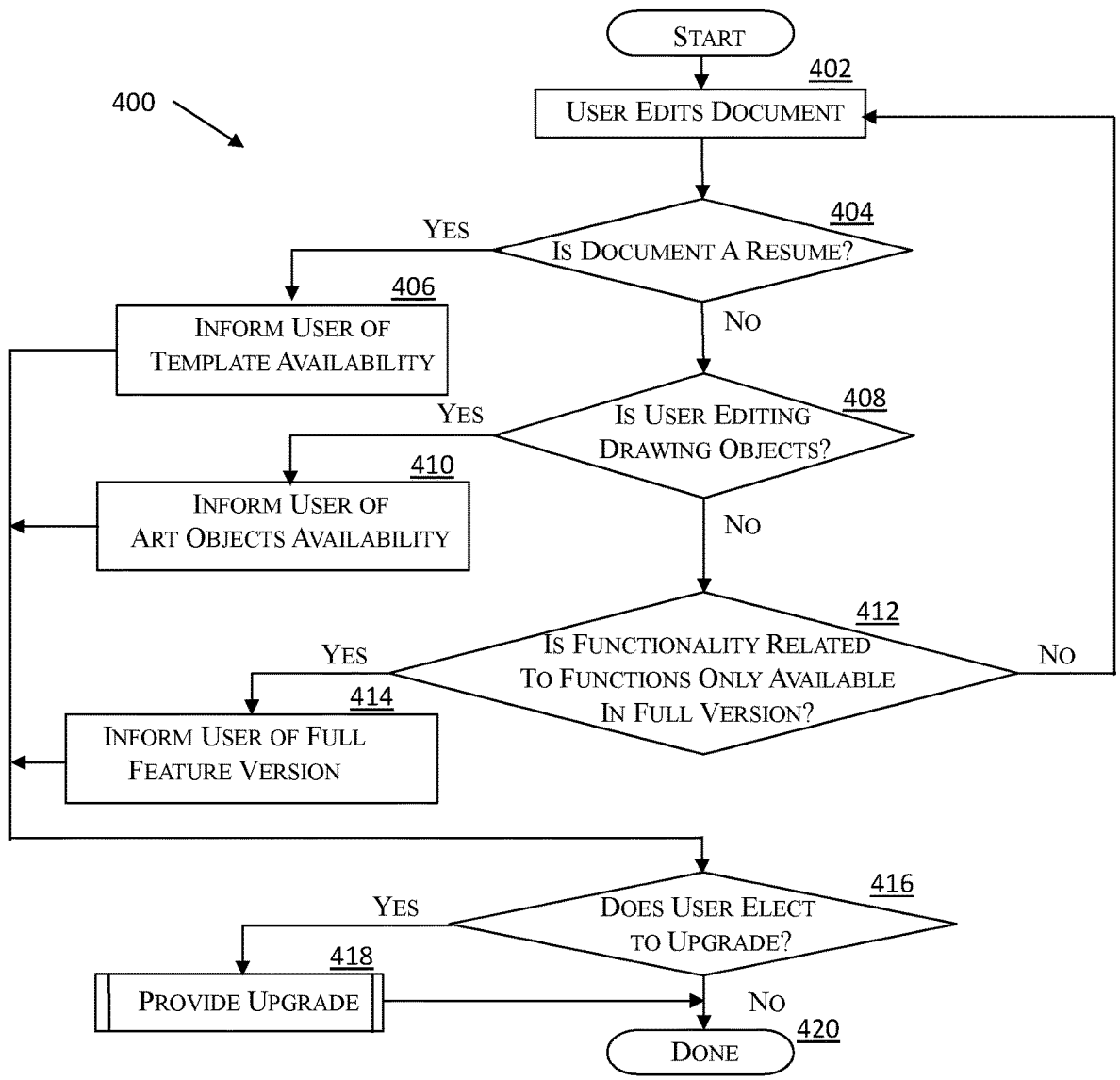
FIGS. 4A and 4B are process flows for the starter application processing user input to determine when to solicit the user for the upgrade.
Figure 4B:
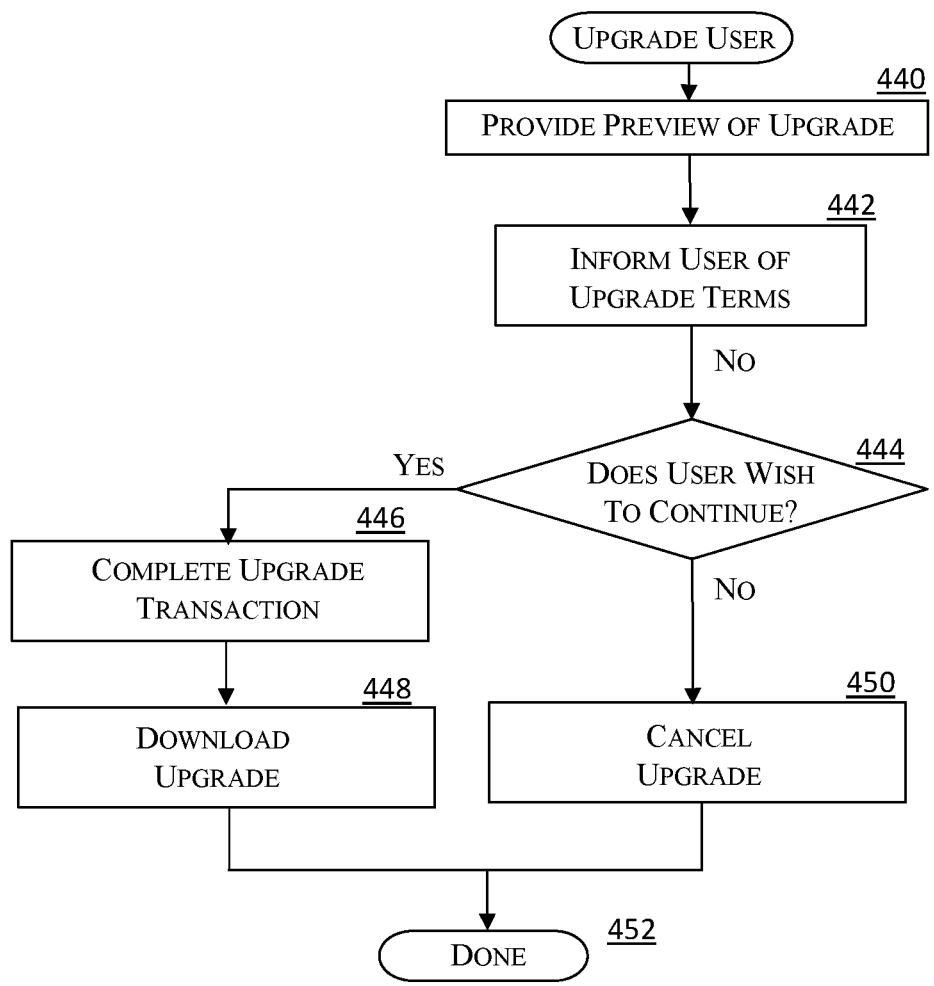

One embodiment of a process flow 400 for providing a context dependent solicitation for a starter application is shown in FIGS. 4A and 4B. It should be appreciated that the logical operations described herein with respect to FIGS. 4A and 4B and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should also be appreciated that more or less operations may be performed than shown in FIGS. 4A and 4B and described herein. These operations may also be performed in a different order than those described herein. The operations shown in FIGS. 4A and 4B are merely illustrative, and additional, or other operations may be defined in other embodiments.

FIG. 4A illustrates one form of rule-based logic processing that could occur in the computing device by the solicitation logic when the starter application 215a is executed and the user is editing a document in operation 402. The example provided should not be interpreted as limiting the types of logic processing that can be used to trigger an upgrade solicitation. Other, more complex, types of processing can occur to determine when to trigger a solicitation. The processing could involve a probabilistic model for determining the most appropriate solicitation.

The document can be a text based document, a spreadsheet, or some other data corresponding to the function of the starter application. The solicitation logic 220a will know the type of starter application being used and may ascertain what type of document that the user is editing. Specifically, in this embodiment, the solicitation logic 220a ascertains whether the document is a resume in operation 404.

The solicitation logic 220a may ascertain the document is a resume by applying rules associated with a resume (e.g., a name and address in the center of the first page, the existence of the word "resume" in the file name, the presence of dates in a structured manner, etc.). The solicitation logic 220a may further provide a portion of the document to server 108 for further analysis to determine whether the document is a resume or not.

If the solicitation logic 220a ascertains in operation 404 that the document is a resume, then in operation 406 the solicitation logic 220a may initiate a context dependent solicitation by informing the user of the availability of a template for drafting resumes. The solicitation process may involve informing the user of the type of templates available, potential resume drafting suggestions, or other resume related information. This determination of which resume related information to provide to the user may as complex as applying a sophisticated model based on observed user actions to as simple as providing the most frequently downloaded resume related information.

If the solicitation logic 220a in operation 404 determines the document is not a resume, then in operation 408 the solicitation logic 220a may ascertain whether the user is invoking functionality related to graphical objects, such as editing a drawing object. The user may be inserting an image, editing an image, or otherwise performing actions on drawing objects. This action may trigger the solicitation logic 220a in operation 408 to solicit the user by informing the user of the availability of drawing art objects, including so-called "clip-art" in operation 410.

If the solicitation logic 220a in operation 4080 determines the user is not editing drawing objects, the solicitation logic 220a may then ascertain in operation 412 whether the functionality being requested by the user may be related to functions that are only available in the full version of the application. For example, a spreadsheet program may not allow the full capabilities of manipulating tables, or a word processing program may not allow the full capabilities for editing styles or using templates. As noted earlier, various models and processes may be incorporated in the solicitation logic. Once the solicitation logic 220a in operation 412 determines that the currently invoked functions are related to functions only available in the full version, the solicitation logic 220a could inform the user of the availability of these functions in the full version in operation 414.

Informing the user of the upgrade could occur by presenting the user with text, video, graphics, sounds, etc. The content of this information could vary according to context, so that solicitation does not appear formalistic to the user. Thus, even if the solicitation in different contexts is focused on the same upgrade, the approach and style of the solicitation could vary in each context.

Other context dependent solicitations could occur in addition to, or in lieu of, those disclosed above. For example, the solicitation logic could be triggered by detecting an occurrence of a current action or document content, as described above. Alternatively, the solicitation logic may detect a history of actions or related events which collectively indicate an opportunity to solicit an upgrade from the user. Specifically, if the user repeatedly uses certain features in the starter application, then the user may be solicited after a fixed number of times, e.g., on the $5^{th}$ instance of using the feature. Further, if the user has been presented with the solicitation several times and has not opted to upgrade, the solicitation logic may cease offering solicitations, or may vary the solicitation prompt. This avoids the solicitation logic becoming an annoying occurrence to the user.

If there are no opportunities identified for soliciting the user, namely if the results are "no" for operations 404, 408, and 412, then the processing loops back to operation 402 where the process continues to monitor the editing performed by the user. It may be that insufficient text has been entered to ascertain the document or to sufficiently identify a context dependent solicitation opportunity. If, however, a solicitation has occurred in either operation 404, 408, or 412, then the process in 416 determines whether the user elects to receive the upgrade. If the determination is yes, then in operation 418 the upgrade is provided to the user. If not, then process completes in operation 420. In other embodiments, the process may loop back to operation 402, where the process repeats. In this case, a different form of solicitation may occur.

The process for upgrading a user in operation 418 is shown in additional detail in FIG. 4B. In FIG. 4B the user in operation 440 may be provided with information, or a preview, of the upgrade. This may be followed in operation 442 with the terms of the upgrade, including the price, method of transaction, system compatibility requirements, etc.

The user may be provided an opportunity in operation 444 to continue the transaction or abandon the upgrade. If the user continues, then in operation 446 the upgrade transaction is completed. In some embodiments, the upgrade is downloaded in operation 448. If the user does not continue with the upgrade, then in operation 450 the upgrade is cancelled. The process then completes in operation 452.

The provision for upgrading a user in operation 418 may occur in different ways. The solicitation logic 220a may connect to a web site via the limited access browser 235a to receive the requested templates, clip-art, etc. Appropriate user interfaces for providing payment may be also included either in the solicitation logic 220a, in another module in the starter application package 102, and interact with the server 108 using the limited access browser 235a. The process of receiving the upgrade may involve actual transmission of the upgrade from a source at another server to the user's computing device. For example, if the solicitation is for graphical objects, a library of graphical objects may be downloaded to the user for selection and insertion into the document.

Another form of enabling access to an upgrade may be accomplished by transmitting an authorization key or similar code authorizing the user to access capabilities that are normally contained, but locked, in the starter application. For example, in one embodiment, the starter application and the full version of the Application are pre-loaded on the computing device at the time of manufacturer, but the full version is locked. Thus, the user can only use the starter application portion. The process of upgrading involves receiving an authorization key which unlocks the full version, thus allowing the user access to the full capabilities. In this manner, less information must be downloaded to the user to obtain the benefits of the upgrade.

Further, the upgrade can be accomplished while the user is working within a document of the starter application. Access to the full version may be provided while the document is being edited, so that the user is not required to save and close the application, and then restart the computer or re-open the document. This provides a more convenient approach to the user for instantly accessing the full version.

Further, the unlocking of access to the full version of the application may also provide the user with access to other applications. This includes applications which the user did not have any corresponding starter applications. For example, if the user is provided with a word processing starter application, the user may upgrade in place to a productivity suite that include the full version of the word processing application and a graphics editing application.

The process flow in FIGS. 4A and 4B represents only a few of the potential rules that the solicitation logic 220a can be incorporated for detecting an opportunity to solicit the user. It should be appreciated that a number of rules or conditions could be defined for detecting the opportunity to trigger the solicitation. The solicitation logic 220a can be limited to only soliciting the user for the full version of the application, or may also include soliciting the user for libraries of templates, on-line tutorials, etc.

In another embodiment, the upgraded application could comprise one of several available versions, with the user selecting which version to upgrade to. For example, as previously noted, the user may be using a starter application, and other functional levels may be available, such as the advanced version and the professional version. In addition, there may be available an advanced version 1.0 and version 2.0 available for upgrade. Similarly, there may be a professional version 2.0 and 3.0. The user may be presented with a number of options of the version to upgrade to.

Further, the upgrade may not be limited to a single application. One of the options presented to the user may be to upgrade to a suite of related applications. Thus, when upgrading the word processing application, an upgrade to other applications may be included, such as upgrading a graphics presentation program, a spreadsheet program, and other productivity application. In other embodiments, the upgrade may only involve purchasing a different type of application or service capability. For example, the user may be using a starter word processing application that incorporates minimal drawing capabilities. After detecting the user has repeatedly access the drawing capabilities, the solicitation logic prompts the user to upgrade to provide access to a graphical editing program. The user may opt to do so, and retain use of the starter word processing application.

As noted previously, the solicitation logic itself can be upgraded and managed by the server 108. The solicitation logic is not necessary static (e.g., limited to the version initially deployed with the starter application). The solicitation logic can be dynamically upgraded, typically under the direction of the server 108, but without the direct intervention or control by the user.

An initial version of the solicitation logic may be incorporated with a starter application, and this version may incorporate certain algorithms for triggering solicitations. Over the course of time, additional products or applications may be available, which were not available when the solicitation logic was defined. Further, over time, additional algorithms for triggering solicitations may be defined. Without upgrading of the solicitation logic itself, it would not be possible for the solicit logic to be aware of newly defined products. Thus, the solicitation logic may incorporate a version identified number which is indicated to the server 108, which can then perform version management. Specifically, server 108 can download a new version of the solicitation logic as appropriate.

Figure 5:
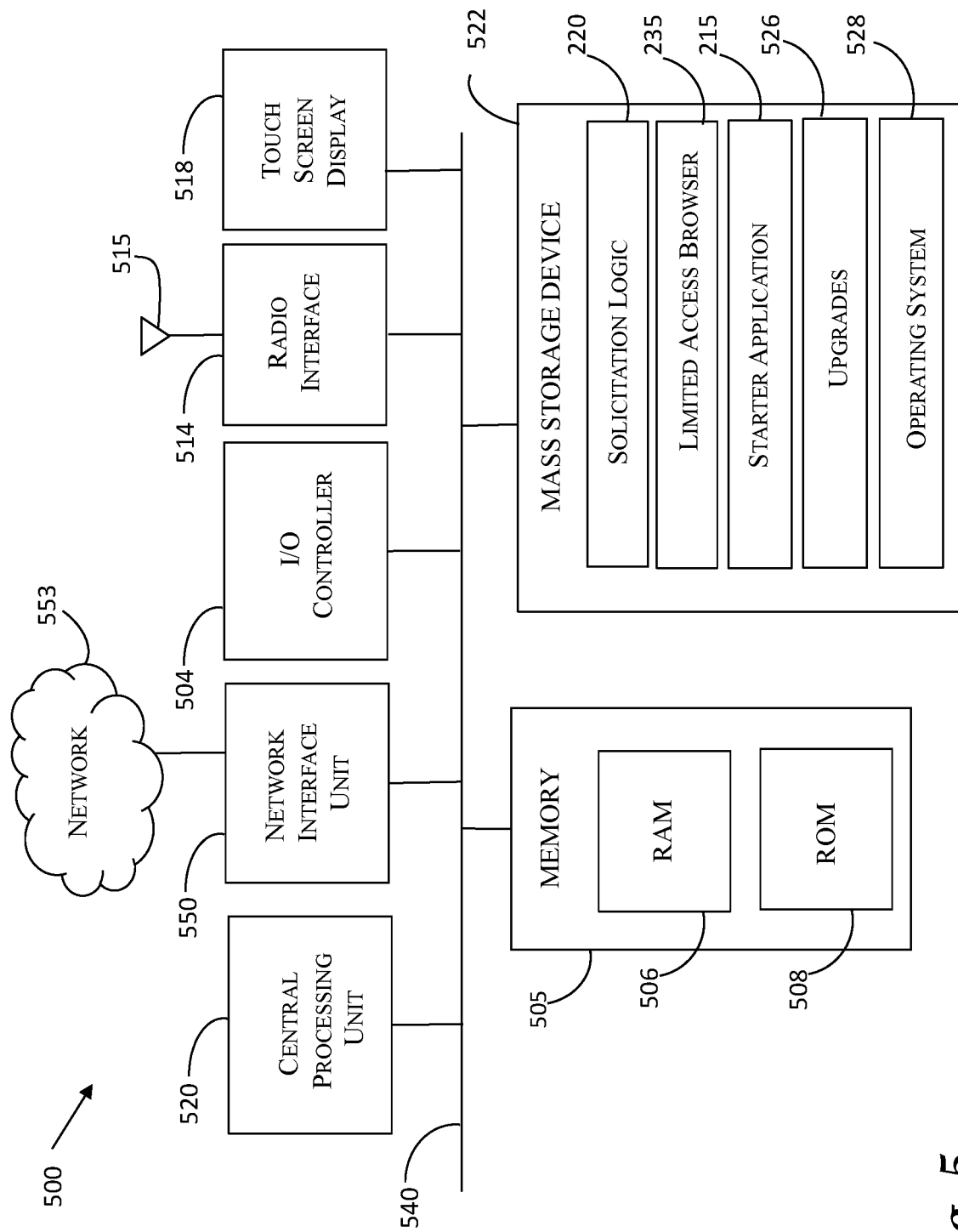
FIG. 5 is an illustration of a computer architecture of the computing device executing the starter application for soliciting the user for the upgrade.

An embodiment of the computing architecture for the computing device 102 for accomplishing the above operations is shown in FIG. 5. FIG. 5 shows an illustrative computing architecture for a computer 500 capable of executing the software components described. The computer architecture shown in FIG. 5 may illustrate a conventional computer, laptop, tablet, or other type of computer utilized to execute any aspect of the software components presented herein. Other architectures or computers may be used to execute the software components presented herein.

The computer architecture shown in FIG. 5 includes a central processing unit 520 ("CPU," and also referred to herein as a "processor"), a system memory 505, including a random access memory 506 ("RAM") and a read-only memory ("ROM") 508, and a system bus 540 that couples the memory to the CPU 520. A basic input/output system containing the basic routines that help to transfer information between elements within the server 500, such as during startup, is stored in the ROM 508. The computer 500 further includes a mass storage device 522 for storing an operating system 528, application programs, and other program modules, as described herein.

The mass storage device 522 is connected to the CPU 520 through a mass storage controller (not shown), which in turn is connected to the bus 540. The mass storage device 522 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500. However, the computer readable media does not encompass transitory signals.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers or servers through a network such as the network 553. The computer 500 may connect to the network 553 through a network interface unit 550 connected to the bus 540. It should be appreciated that the network interface unit 550 may also be utilized to connect to other types of networks and remote computer systems.

The computer 500 may also incorporate a radio interface 514 which can communicate wirelessly with network 553 using an antenna 515. The wireless communication may be based on any of the cellular communication technologies or other technologies, such as WiMax, WiFi, or others.

The computer 500 may also incorporate a touch-screen display 518 for displaying information and receiving user input by touching portions of the touch-screen. This is typically present on embodiments based on a tablet computer and smart phone, but other embodiments may incorporate a touch-screen 518.

The computer 500 may also include an input/output controller 504 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5). The input/output controller may also provide an interface to an audio device, such as speakers, and/or an interface to a video source, such as a camera, or cable set top box, antenna, or other video signal service provider.

As mentioned briefly above, a number of program modules and data files may be stored in the mass storage device 522 and RAM 506 of the computer 500, including an operating system 528 suitable for controlling the operation of a networked desktop, laptop, tablet, or server computer. The mass storage device 522 and RAM 506 may also store one or more program modules or data files. In particular, the mass storage device 522 and the RAM 506 may store the solicitation logic 220a. The same storage device 522 and the RAM 506 may store the limited access browser 235a. The mass storage device 522 and the RAM 506 may also store other types of applications and data, including the starter application module 215 and various upgrades 526. The upgrades 526 are examples of upgrades which are locked in the starter application 215 and can be accessed only once an authorization key is obtained through the upgrade process.

It should be appreciated that the software components described herein may, when loaded into the CPU 520 and executed, transform the CPU 520 and the overall computer 500 from a general-purpose computing system into a special-purpose computing system customized to facilitate the functionality presented herein. The CPU 520 may be constructed from any number of transistors or other discrete circuit elements, which may individually or collectively assume any number of states. More specifically, the CPU 520 may operate as a finite-state machine, in response to executable instructions contained within the software modules disclosed herein. These computer-executable instructions may transform the CPU 520 by specifying how the CPU 520 transitions between states, thereby transforming the transistors or other discrete hardware elements constituting the CPU 520.

Encoding the software modules presented herein may also transform the physical structure of the computer-readable media presented herein. The specific transformation of physical structure may depend on various factors, in different implementations of this description. Examples of such factors may include, but are not limited to the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 500 in order to store and execute the software components presented herein. It also should be appreciated that the computer 500 may comprise other types of computing devices, including hand-held computers, embedded computer systems, personal digital assistants, and other types of computing devices known to those skilled in the art. It is also contemplated that the computer 500 may not include all of the components shown in FIG. 5, may include other components that are not explicitly shown in FIG. 5, or may utilize an architecture completely different than that shown in FIG. 5. For example, some devices may utilize a main processor in conjunction with a graphics display processor, or a digital signal processor. In another example, a device may have an interface for a keyboard, whereas other embodiments will incorporate a touch screen.

Based on the foregoing, it should be appreciated that systems and methods have been disclosed for providing context dependent solicitation of an upgrade in a starter application. It should also be appreciated that the subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

The invention claimed is:

1. A system, comprising:
a processor; and
a memory storing a starter application comprising a reduced capability set of a full version of an application, the memory having computer-readable instructions stored thereupon that, when executed by the processor, cause the processor to perform operations comprising:
receiving input for editing a document, identifying, based at least in part on the input, a type of the document, applying a model to the input to determine that a user is following a pattern that suggests a likelihood of the user upgrading the reduced capability set of the full version of the application, wherein the model is built based at least in part on monitored input of other users that have upgraded the reduced capability set of the full version of the application and the input and the monitored input occurring in a same context, and wherein the same context comprises each of: a type of document content being edited, a length of time the reduced capability set of the full version of the application has been used without purchasing an upgraded capability set of the full version of the application, and a type of help function that is being invoked, providing, based at least in part on the type of the document and the determining that the user is following the pattern, access to the upgraded capability set of the full version of the application, and receiving subsequent input for purchasing the upgraded capability set of the full version of the application.

2. The system of claim 1, further comprising an input/output interface configured to access a server over a network connection, and wherein the operations further comprise accessing a limited access browser to provide the upgraded capability set of the full version of the application.

3. The system of claim 2, wherein the memory further stores the upgraded capability set of the full version of the application in a locked form, and wherein the operations further comprise receiving an authorization key from the server using the limited access browser to unlock and provide access to the upgraded capability set of the full version.

4. The system of claim 2, wherein the operations further comprise processing a transaction to purchase the upgraded capability set of the full version of the application.

5. The system of claim 2, wherein the operations further comprise:
transmitting at least a portion of the document to the server; and
receiving an indication from the server as to the type of the document.

6. A method comprising:
receiving input for editing a document in a starter application that comprises a reduced capability set of a full version of an application;
identifying, by one or more processors and based at least in part on the input, a type of the document;
applying a model to the input to determine that a user is following a pattern that suggests a likelihood of the user upgrading the reduced capability set of the full version of the application, wherein the model is built based at least in part on monitored input of other users that have upgraded the reduced capability set of the full version of the application and the input and the monitored input occurring in a same context, and wherein the same context comprises each of: a type of document content being edited, a length of time the reduced capability set of the full version of the application has been used without purchasing an upgraded capability set of the full version of the application, and a type of help function that is being invoked;
generating, based at least in part on the type of the document and the determining that the user is following the pattern, a notification soliciting a purchase of the upgraded capability set of the full version of the application;

receiving subsequent input for purchasing the upgraded capability set of the full version of the application; and providing, based at least in part on the subsequent input, access to the upgraded capability set of the full version of the application.

7. The method of claim 6, further comprising accessing a limited access browser to provide the upgraded capability set of the full version of the application.

8. The method of claim 7, further comprising receiving an authorization key from a server using the limited access browser to unlock and provide access to the upgraded capability set of the full version of the application.

9. The method of claim 6, further comprising processing a transaction to purchase the upgraded capability set of the full version of the application.

10. The method of claim 6, further comprising:
transmitting at least a portion of the document to a server; and
receiving an indication from the server as to the type of the document.

11. The system of claim 1, wherein:
the editing of the document comprises creation of the document; and
the upgraded capability set of the full version of the application comprises an expanded capability set compared to the reduced capability set.

12. The system of claim 1, wherein the type of the document is identified based on a structure of content in the document.

13. The system of claim 1, wherein the type of the document is identified based on a format of content in the document.

14. The system of claim 1, wherein the upgraded capability set of the full version of the application comprises one or more templates for the type of the document.

15. The system of claim 1, wherein the upgraded capability set of the full version of the application comprises a tutorial for the type of the document, the tutorial providing instructions for a user to perform a function in association with the editing of the document.

16. The method of claim 6, wherein the type of the document is identified based on a structure of content in the document.

17. The method of claim 6, wherein the type of the document is identified based on a format of content in the document.

18. A system, comprising:
a processor; and
a memory storing a starter application comprising a reduced functionality of a full version of an application, the memory having computer-readable instructions stored thereupon that, when executed by the processor, cause the processor to perform operations comprising:
receiving a request to perform a function in associating with editing a document in the starter application;
analyzing a structure of content in the document to identify a type of the document;
applying a model to input to determine that a user is following a pattern that suggests a likelihood of the user upgrading the reduced functionality of the full version of the application, wherein the model is built based at least in part on monitored input of other users that have upgraded the reduced functionality of the full version of the application and the input and the monitored input occurring in a same context, and wherein the same context comprises each of: a type of document content being edited, a length of time the reduced functionality of the full version of the application has been used without purchasing upgraded functionality of the full version of the application, and a type of the function that is being requested to be performed;

providing, based at least in part on the type of the document and the determining that the user is following the pattern, access to the upgraded functionality of the full version of the application, the upgraded functionality enabling performance of the function or assisting with performance of the function; and receiving subsequent input for purchasing the upgraded functionality of the full version of the application.

\* \* \* \* \*